United States Patent [19]

Swartz

[11] 4,362,750

[45] Dec. 7, 1982

[54] PRODUCTION OF FERMENTED TYPE SAUSAGE

[75] Inventor: William E. Swartz, Upper St. Clair, Pa.

[73] Assignee: Stauffer Chemical Company, Westport, Conn.

[21] Appl. No.: 226,262

[22] Filed: Jan. 19, 1981

Related U.S. Application Data

[63] Continuation of Ser. No. 88,244, Oct. 25, 1979, abandoned.

[51] Int. Cl.³ .................. A22C 11/00; A23L 1/22; A23L 1/31
[52] U.S. Cl. .................................. 426/59; 426/105; 426/264; 426/266; 426/646; 426/652
[58] Field of Search ............... 426/42, 43, 34, 41, 426/105, 652, 646, 59, 264, 266

[56] References Cited

U.S. PATENT DOCUMENTS

| | | | |
|---|---|---|---|
| 2,994,085 | 7/1961 | Teich | 426/58 |
| 3,615,697 | 10/1971 | Hollenbeck | 426/533 |
| 4,001,437 | 1/1977 | Jaeggi et al. | 426/42 X |
| 4,110,476 | 8/1978 | Rhodes | 426/42 X |
| 4,161,552 | 7/1979 | Melachouris | 426/646 |
| 4,220,668 | 9/1980 | Wistreich et al. | 426/646 X |

FOREIGN PATENT DOCUMENTS

| | | | |
|---|---|---|---|
| 7405185 | 10/1974 | Netherlands | 426/42 |
| 604207 | 10/1976 | U.S.S.R. | 426/59 |

OTHER PUBLICATIONS

Webb, B. H. et al., "Fundamentals of Diary Chemistry", The Avi Publ. Co., Inc., Westport, Conn. 1965, p. 739.

Kay S., "Yogurt Cookery", H. P. Books, P.O. Box 5367, Tucson, Az., 1978, pp. 32, 64 and 69.

*Primary Examiner*—Robert A. Yoncoskie
*Attorney, Agent, or Firm*—Paul J. Juettner

[57] ABSTRACT

Fermented type sausage can be prepared with a taste equivalent to or improved over naturally fermented type sausage by the inclusion in the sausage of a cultured dairy product.

16 Claims, No Drawings

PRODUCTION OF FERMENTED TYPE SAUSAGE

This is a continuation, of application Ser. No. 88,244 filed Oct. 25, 1979, now abandoned.

BACKGROUND OF THE INVENTION

1. Field of the Invention

The present invention relates to fermented type sausages and improved methods for preparing the same.

2. Prior Art

Fermented sausages such as cervelat, summer sausage, salami, thuringer and the like are seasoned meat sausages which rely upon the growth of various organisms for flavor development. A typical cervelat summer sausage can be prepared by mixing ground beef trimmings, pork and beef hearts, beef cheeks, tripe and stomachs and coarsely ground pork trimmings and back fat with a salt-cure mixture. The mixture is cured for two days at 2.2° C.-3.6° C. After regrinding, the mixture is vacuum stuffed into casings. The sausage after washing is held in a green room for 24 hours at 7.2° C. and then smoked. This method is disclosed in Food Products Formulary, Vol. 1, Meats, Poultry, Fish, Shellfish, by S. L. Komarik et al. (Avi Publishing Co.) at page 33 et seq.

The original procedure for preparing these sausages relied upon various organisms which were indigenous to sausage ingredients which originated in individual sausage making establishments. This method of chance inoculation of organisms of unascertained types led to unpredictable flavor and texture.

Since the chemical and bacteriological changes within the meat emulsion affect proper aging, coloring and stabilizing of the meat, and since the aging and coloring are related to taste and appearance, control over these changes is required for uniform sausage. The chemical and bacteriological changes can be controlled by inoculating the sausage emulsion with a pure culture. The use of externally added culture is disclosed in U.S. Pat. No. 2,907,661 which teaches that the fermented type sausages can be prepared by inoculation with a pure lactic acid starter culture such as Pediococcus cerevisiae.

For example, frozen lactic acid starter culture may be used in processing thuringer, summer sausage, cervelat, Lebanon bologna, pork roll, pepperoni, hot bar sausage, and the like. High quality fresh or frozen beef trimmings, pork trimmings, pork fat and the like with low bacterial counts are coarse ground with the cure ($NaNO_2$), salt and spices. The pure culture after thawing is added at a rate of from about 1 to about 4 grams per kilogram of meat at a point before the end of the chop to ensure uniform distribution of the culture throughout the meat. After stuffing the mix into casings, the product is heated at fermentation temperature for a period of time sufficient to develop the desired tang by fermentation (about 12-24 hours). The product is then smoked and dried as required. This method is disclosed in Food Products Formulary, ibid., at page 46 et seq.

While the use of a pure culture strain has decreased the variability of the fermented type sausage, fermentation, being a natural process, is still subject to variation. Organism distribution as well as growth rates in any one area of the sausage may vary thus varying the taste developed. The end point of growth is usually determined by time or measurement of pH. On an average, these methods may be acceptable but for individual batches fermentation may not have been completed or gone beyond the point desired. Also, the fermenting sausage must be held under controlled conditions in the factory for the 12 to 24 hours to effect the proper development of lactic acid for the tangy taste. The output of the factory can be increased if this fermentation time as well as its possible variability could be reduced.

In addition, the pure culture is shipped in one instance in the frozen form. Apart from requiring refrigerated shipping and handling, the frozen culture must be thawed and diluted in water before addition to the sausage batch. Also, the manufacturer emphasizes that the following are critical factors relating to the use of the culture:

(1) Fresh or frozen meats of high quality (low bacterial population) should be used to control fermentation;

(2) For best results, straight sodium nitrite should be used at a level of 0.078 grams per 100 kilograms of meat;

(3) At least 0.75 kilograms dextrose per 100 kilograms meat must be used for optimum bacteria growth; and (4) The proper level of humidity is required to maintain the proper moisture balance for optimum lactic acid organism growth.

While some of these factors such as low bacterial counts and reduced sodium nitrite may be good sausage making steps, the addition of dextrose and the humidity control are steps peculiar to the use of the culture.

Acidification agents such as glucono deltalactone (GDL) have also been added to meat emulsions. GDL does not lower the pH while the emulsion is being made. In the presence of heat and moisture, GDL hydrolyzes to gluconic acid. GDL is also used to increase the speed of color formation in the emulsion. (See Meat Emulsions, R. Saffle, Advances in Food Research, 16 (1968), pp. 105–160 at page 152).

THE INVENTION

In accordance with the present invention, it has now been discovered that fermented type sausage can be prepared with a taste equivalent to or improved over naturally fermented type sausage by the inclusion in the sausage of a cultured dairy product. The preferred material is dried yogurt solids. By the use of the cultured dairy product as a flavoring material, the fermented type sausage is given an instant tangy flavor without the normal 12 to 24 hours of fermentation presently needed to accomplish the same result. The sausage can then be moved from the stuffing area to other areas of the plant for the traditional drying and aging process which is required to maintain the stability of the sausage. The tangy flavor can be more uniformly developed throughout the sausage since culturing is more uniformly performed outside the meat rather than within. No additional ingredients such as dextrose to assist bacterial growth need be added. The cultured dairy product can be used in a dry state not requiring any thawing and diluting as required when using a frozen culture. An accurate determination of endpoint and of flavor of the fermented dairy protein system including batch blending for a more uniform flavor can be made whereas the present systems rely on natural fermentation and chance endpoint control to provide uniformity. Also, the cultured dairy product can be tasted before addition or blended in a test sausage to determine the actual flavor to be achieved by a sausage run. Variations in flavor are also possibly by this method by using different dairy bases and bacteria or blends of different ferments. The cultured dairy product can be used to provide a tangy flavor for such diverse comminuted meat products as cooked smoked and unsmoked sausage such as frankfurters, knockwurst, bologna, breakfast sausage, smoked links, Polish sausage, Vienna sausage, luncheon loaves, chopped meats, meatloaf, meat sticks, pepperoni and the like. Because acidity is not as low when using the cultured dairy product, refrigeration is suggested for dry or semi-dry sausages.

DETAILED DESCRIPTION OF THE PRESENT INVENTION

The cultured dairy product which can be added to the meat products in the present invention to add a tangy taste can be prepared using bacteria or combinations of bacteria which will provide an edible acidic ferment. Selection of any bacteria system depends on the taste desired in the final product. Generally, the bacteria which will affect this end are those normally used in preparing yogurt which are L. bulgaricus, and S. thermophilus. Other bacteria systems such as L. acidophilus, P. cerevisiae and L. plantarum can also be used if desired. The cultured dairy product can contain live bacteria for further culturing in the meat product or be pasteurized as desired. The cultured dairy product can provide all, or part of the acidity needed for flavor. Natural fermentation in the comminuted meat from bacteria naturally present or added as pure culture or part of the cultured dairy product can be used to provide the remainder of the acidity. While flavor variation can be achieved in this manner, it is preferred to provide the total flavor by addition of the cultured dairy product.

The cultured dairy products can be prepared from a dairy derived product containing protein and lactose. These products include whole milk, though this is less preferred, skim milk (liquid or dry), and preferably, whey (liquid, dry or concentrate). Also included in the term "dairy products" are products which are derived from milk or whey such as sodium caseinate, casein or sodium caseinate enriched NFDM, decalcified milk, partially clarified whey, delactosed whey, whey protein concentrate, deproteinzed/delactosed whey and the like. The latter have undergone some form of treatment to remove certain desirable or undesirable components. Blends of various dairy products can be used if desired such as raw whey and concentrated whey and if desired, NFDM and/or sodium caseinate. Other blends can be formulated as desired by one skilled in the art.

After culturing to the desired endpoint (a pH more preferably within the range of 4.2-4.3), alternative ingredients such as milk protein containing additives such as NFDM, sodium or calcium caseinate, acid stable caseinate, whey solids, concentrated whey protein as well as other non-dairy additives such as hydrolyzed cereal solids such as corn syrup solids, sugars, vegetable protein and the like and mixtures thereof can be blended with the ferment. This can easily be accomplished by direct blending or blending the alternative ingredient with a portion of the ferment which is reblended with the remainder of the ferment. Additional ingredients added after fermentation can be added to either or both portions as desired. If desired, a portion of the basic dairy ingredients with an alternative ingredient added such as a protein enricher can be cultured separately from a portion without the added ingredient and the two products combined to obtain the final product.

Agents for promoting bacterial growth can also be added if desired. These agents include carbohydrates, such as dextrose, a protein containing growth stimulant such as autolyzed yeast extract and if desired, trace minerals such as magnesium and manganese. Phage control agents may also be added if desired.

In preparing the cultured products of the present invention, the use of techniques for good bacteriological growth are used. The dairy product is preferably pasteurized or sterilized prior to inoculation to destroy any microorganisms which might interfere with the culturing or lead to an off-flavor. Pasteurization is preferably high heat/short term though low heat/long term pasteurization can be used.

Fermentation is usually accomplished at a temperature of about 35°-43° C. Fermentation is continued until the desired endpoint is reached, preferably, until a pH within the range of from about 4.1 to about 4.4 and more preferably from about 4.2-4.3 is obtained. The pH is dependent on the final product desired. Some of the more preferred products have protein additives added after fermentation. Since some of these additives do not contribute acidity and act as buffers, the initial acidity of the ferment is adjusted to compensate for this buffering effect. A final product pH within the range of 4.5 to 4.8 is desirable.

The cultured dairy product can be used as a liquid or, preferably, as a dry composition. A particularly preferred product is a spray dried composition though other methods of drying such as freeze-drying, drum drying, and the like can be used. In order to preserve the product in the liquid state, appropriate refrigeration or freezing is generally required.

Specific products which have been found effective in the present invention can be described as:

PRODUCT A—whey concentrate adjusted to a total solids content of 14-16% with raw whey is fermented with L. bulgaricus and S. thermophilus. Whey protein concentrate is added after fermentation.

PRODUCT B—whey concentrate adjusted to a total solids content of 14-16% with raw whey is fermented with L. bulgaricus and S. thermophilus. Whey protein concentrate, non-fat dried milk and sodium caseinate are added after fermentation without concentration of the ferment (CFS<sup>TM</sup>AS, Stauffer Chemical Company).

PRODUCT C—corn syrup solids are added to the concentrated product of a whey concentrate adjusted to a total solids of 14-16% with raw whey fermented with L. bulgaricus and S. thermophilus. (CFS<sup>TM</sup>FA-Stauffer Chemical Company).

PRODUCT D—whey concentrate adjusted to 14-16% total solids with raw whey and fermented with L. bulgaricus and S. thermophilus. An acid stable caseinate is blended with a non-condensed portion of the ferment and combined with the remaining portion. (CFS<sup>TM</sup> R-Stauffer Chemical Company).

The additives noted in the products above are blended with liquid ferments and the whole blend is then spray dried to provide the final dried product.

The cultured dairy product can be added at any stage of the sausage making procedure prior to stuffing. Preferably, the cultured product is added at the time of the addition of the spices and cure. For this reason, it is preferred that the cultured product be added as a dry powder although the cultured product can be added as a liquid or concentrate prior to drying or as reliquified dried material. No special technique is required for the addition nor are any changes required to be made in the sausage preparation sequence (prior to fermentation).

Instead of holding the sausage or sausage blend for a period of time needed to effect fermentation (usually 12-24 hours), this step can be reduced or deleted as desired. Ripening, drying and smoking proceed as required for each sausage recipe.

As a flavor enhancer, the cultured dairy products of the present invention can be added to comminuted meat and non-comminuted meat (skeletal meat). Comminuted meat includes in addition to dry and semi-dry sausage, fresh sausage (pork sausage, beef sausage, Italian sausage, bockwurst, bratwurst, and the like), cooked smoked and unsmoked sausages (frankfurters, weiners, bologna, cooked salami, mixed ham, smoked sausage, Polish sausage, liver sausage, berliner sausage, knockwurst, knoblauch sausage, brown and serve sausage, Vienna sausage), canned luncheon meat and luncheon loaves such as spiced pork or chopped ham, New England pressed ham, minced ham, pickle/pimento loaf, canned veal loaf, baked pepper loaf, snack meats such as meat sticks, pepperoni, and the like. The flavoring compositions of the present invention can also be used in ground meat and meat loaves. Injection, soaking or coating skeletal muscle meat with these cultured dairy compositions can also be accomplished if desired. The preferred area of use is in dry and semi-dry sausage. Recipes for preparing the foregoing meat products can be found on pages 26-138 of Food Products Formulary, Vol. 1, Meats, Poultry, Fish, Shellfish, ibid., the contents of which are hereby incorporated by reference.

The process of the present invention can be used to prepare a pepperoni type sausage which can be used as a pizza topping. The cultured dairy solids provides the tangy flavor characteristic of pepperoni without the necessity of long fermentation times. a slightly softer texture provides a product which is more easily sliced and used for pizza topping.

The cultured dairy product can be added to meat or sausage emulsion in any amount required to obtain a desirable flavor. The cultured dairy product can be used for all or part of the tangy flavor normally associated with dry or semi-dry sausage. Sausage such as cervelat or summer sausage would require from about 20 grams to about 80 grams and preferably from about 30 grams to about 60 grams per kilogram of meat or emulsion, i.e., from about 2% to about 8% based on the weight of the meat. Other sausages may require more or less depending on the desired final flavor. In meat systems other than dry or semi-dry sausage, appropriate amounts can be easily determined by one skilled in the art.

The cultured dairy solids provide a tangy flavor in the emulsion characteristic of fermented sausage. The pH of the emulsion containing the cultured dairy solids is not as low as that achieved using fermentation. It is recommended that dry or semi-dry sausages of the invention be refrigerated as they are not as room temperature stable as naturally fermented sausage. While fermentation in the meat is possible using the cultured dairy products, the concentration of bacteria may not be high enough to make a noticeable change in the sausage.

The cultured dairy products can be used alone or in combination with cultures, other cultured products, stabilizers, acids, bacteriocides and fungicides. The cultured dairy product can be pasteurized without modifying the acidic flavor.

The present invention will be more specifically illustrated in the examples which follow.

As used herein, the term meat includes red meat such as beef, pork, veal, and lamb or mutton as well as poultry meat such as chicken, turkey, and duck.

EXAMPLE 1

Summer sausage was prepared using various levels and types of cultured dairy products. The following meat formulation was used:

| Beef Chuck | 16.39 kg |
|---|---|
| Pork Butts | 10.9 kg |
| Salt (NaCl) | 750.6 g |
| Corn Syrup (light) | 547 g |
| Dextrose | 224.3 g |
| MSG | 68.4 g |
| Black Pepper (Ground) | 102.6 g |
| Sodium Erythorbate | 14.9 g |
| Sodium Nitrite | 8.4 g |
| Mustard | 16.9 g |
| Nutmeg | 16.9 g |
| Allspice | 16.9 g |

The meats were trimmed and held overnight at 1.67° C. The beef was ground through a grinder with a plate having 0.476 centimeter openings. The sodium chloride, sodium nitrite (dissolved in 20 milliliters of water), corn syrup, dextrose and spices were mixed with the ground beef for about five minutes. The pork butts were ground in a meat grinder having a plate with 0.95 centimeter openings. The ground beef and the ground pork were mixed together for about two minutes. The sodium erythorbate was dissolved in approximately 20 milliliters of water and mixed thoroughly with the meat mixture. The meat mixture was reground through a grinder having a plate with 0.318 centimeter openings. Four 6.81 kilogram samples were weighed and mixed separately in a Hobart mixer for three minutes at setting number 1 with scraping after each minute with the following cultured dairy products:

1A. 204.3 grams (3%) Product C, ibid.
1B. 204.3 grams (3%) Product D, ibid.
1C. 204.3 grams (3%) Product B, ibid.
1D. 408.6 grams (6%) Product B, ibid.

Samples were stuffed in large diameter casings (fibrous reinforced cellulose) and placed in the smokehouse overnight (43.3° C. to 33.3° C. dry bulb; 37.8° C. to 34.4° C. wet bulb). The next morning the sausages were heated to an internal temperature of 60° C. (65.6° C. dry bulb; 57.2° C. to 60° C. wet bulb). After cooking, the sausages were stored at 1.67° C.

The sausages were characterized by a good tangy flavor similar to traditionally prepared summer sausage.

EXAMPLE 2

Summer sausage was prepared as in Example 1 without holding the unground meat overnight using the following formulation:

| Beef Chuck | 13.62 kg |
|---|---|
| Pork Butts | 9.08 kg |
| Salt (NaCl) | 627 g |
| Ground Black Pepper | 85 g |
| Sodium Erythorbate | 12.4 g |
| Sodium Nitrite | 3.6 g |
| Mustard | 14.2 g |
| Nutmeg | 14.2 g |
| Allspice | 14.2 g |
| Cultured Dairy Product | 1.022 kg |

-continued

| Product B ibid |
|---|

The lean meat was ground as in Example 1. The ground meat was mixed with all the salt and half of the sodium nitrite and enough water to make about a 9% solution. This ground meat was precured by holding the ground meat in the presence of the salt and cure while other preparations were made for the run.

The cultured dairy product was used in an amount of 4.5% based on the weight of the meat block.

The ground mixture was stuffed into large diameter sausage casings and placed in the smokehouse. The sausages were slowly heated until an internal sausage temperature of about 60° C. was reached. The sausages were cooled and removed from the smokehouse.

The sausage had a good texture and an acceptable tangy flavor similar to traditionally prepared summer sausage.

EXAMPLE 3

Two 36.3 kilogram batches of frankfurter emulsion were prepared using the following formulation:

| Lean Beef (Round) | 10.9 kg |
| Lean Pork (Callas) | 6.4 kg |
| Fat Pork (Jowls) | 10.0 kg |
| Water | 8.2 kg |
| Salt (NaCl) | .82 kg |
| Sodium Nitrite | 4 g |
| Sodium Erythorbate | 14.5 g |
| Seasoning Mix | 141.7 g |
| Binder | .82 kg |

The meats were trimmed and held overnight at 1.67° C. The lean meat was ground separately in a meat grinder having a plate with 0.476 centimeter openings. The ground beef, salt, sodium nitrite (dissolved in 20 milliliters of water) and about one-half of the water were mixed in a paddle mixer for five minutes. The ground lean pork was added and mixed for an additional five minutes. The fat pork was ground in a grinder having a plate with 0.95 centimeter openings. The ground fat pork, the balance of the water, spices, binder and sodium erythorbate (dissolved in 20 milliliters of water) were added and mixing was continued for an additional three minutes.

The binder in the first batch was 0.68 kilograms of the cultured dairy product identified as Product B ibid to provide a 3% concentration (based on the meat block) and 0.82 kilograms of the precipitate obtained by neutralizing acid whey (See U.S. Pat. No. 4,036,999).

The binder in the second batch was 908 grams of the cultured dairy product identified as Product C, ibid, providing 3.3% cultured dairy product based on the weight of the meat block.

About nine kilograms from each batch were combined to produce three intermediate batches having about 2.25% (based on the weight of the meat block) cultured dairy solids as binder.

Each batch was emulsified through an emulsifier having a plate with 0.5 millimeter openings, stuffed and linked. All products were then smoked. The smokehouse was preheated to 54.4° C. (dry bulb), 48.9 wet bulb, and the temperature was increased to 76.6° C. dry bulb, 71.1° C. wet bulb. Final internal temperature (by probe) was 73.89° C. The sausages were showered for five minutes, cooled overnight at 1.67° C., vacuum packed and frozen.

While sausage made from Batch 1 and Batch 2 both had acceptable flavor, sausage from Batch 1 was preferred because of a firmer texture.

Texture can be improved by precuring the meat prior to making the sausage. After grinding lean pork and beef, the ground meat can be mixed with all the salt, a portion (half) of the sodium nitrite and enough water to obtain, for instance, a 9% brine solution and held overnight. The remainder of the ingredients can then be added. The fat pork can be ground coarse or fine as desired.

EXAMPLE 4

Pork sausage was prepared according to the following formulation:

| Pork Butts | 19.07 kg |
| NaCl (Evaporated) | .397 kg |
| Black Pepper | 23.8 g |
| Allspice | 5.6 g |
| Whole Mustard Seed | 23.8 g |
| Cultured Dairy Product | .62 kg |
| Product B ibid | |
| Water (1.67° C.) | .95 kg |

The meat was ground in a grinder having a plate with 0.95 centimeter openings. All ingredients were mixed with the meat for about five minutes. The meat was stored in a 1.67° C. cooler for three days until it was stuffed. One third of the sausage was stuffed into 16 millimeter casings, ⅓ into 40 millimeter casings and ⅓ into small sausages of about 4.9 to 7.62 centimeters in diameter and 20 to 30 centimeters in length. The sausages were set into form by freezing and vacuum packed. The sausages were tested both before and after freezing. A desirable flavor was obtained in all instances.

EXAMPLE 5

Pepperoni was prepared using the following formulation:

| Boneless Pork Callas | 11.35 kg |
| Boneless Pork Butts | 4.54 kg |
| Boneless Beef Chuck | 6.81 kg |
| Salt (NaCl) | .68 kg |
| Cultured Dairy Solids | .68 kg |
| Product B ibid | |
| Sodium Nitrite | 3.5 g |
| Sodium Erythorbate | 12.5 g |
| Pepperoni Spice Mix | .68 kg |

The meats were ground through a grinder having a plate with 0.95 centimeter openings. The salt and one-half of the nitrite with a small quantity of water were mixed with the ground meat and held overnight. All the other ingredients were added the next day and mixed for five minutes.

The mixture was then ground through a plate having 0.318 centimeter openings and stuffed in link size casings. The sausages were heat processed without smoke according to the following schedule:

| | DRY BULB | WET BULB |
|---|---|---|
| Preheat | 43.3° C. | 37.8° C. |
| 30 Minutes | 43.3° C. | 37.8° C. |

-continued

|  | DRY BULB | WET BULB |
| --- | --- | --- |
| 30 Minutes | 48.9° C. | 43.3° C. |
| 30 Minutes | 54.4° C. | 48.9° C. |
| 30 Minutes | 60° C. | 54.5° C. |

The sausages were heated to an internal temperature of about 60° C. A flavor comparable to commercial pepperoni was obtained.

What is claimed is:

1. A process for preparing an encased meat product having an acidic taste selected from the group consisting of fermented sausage, dry sausage, semi-dry sausage, fresh sausage, cooked sausage, brown and serve sausage, luncheon loaf and meat sticks which comprises adding to the meat during the preparation of said meat product an effective amount of a dry cultured dairy product prepared by a culturing process using *L. bulgaricus, S. thermophilus, L. acidophilus, P. cerevisiae, L. plantarum* and mixtures thereof sufficient to provide at least some of said acidic taste.

2. The process as recited in claim 1 wherein said cultured dairy product is prepared by a culturing process using a whey protein base.

3. The process as recited in claim 1 wherein said cultured dairy product further includes a member selected from the group consisting of NFDM, whey protein concentrate, sodium or calcium caseinate, acid stable caseinate, whey solids, hydrolyzed cereal solids, vegetable protein, sugars and mixtures thereof.

4. The process as recited in claim 1 wherein said cultured dairy product is used in an amount ranging from about 2% to about 8% by weight of the meat.

5. The process as recited in claim 4 wherein said cultured dairy product is prepared by a culturing process using a blend of *L. bulgaricus* and *S. thermophilus*.

6. The process as recited in claim 1 wherein said culturing process is conducted to an end point within the pH range of from about 4.1 to about 4.8.

7. In a process for preparing an encased meat product which normally includes a fermentation process to increase the acidity of the meat selected from the group consisting of dry sausage, semi-dry sausage, luncheon loaf and meat sticks, the improvement which comprises adding to the meat during preparation of said meat product an effective amount of a dry cultured dairy product prepared by a culturing process using *L. bulgaricus, S. thermophilus, L. acidophilus, P. cerevisiae, L. plantarum* and mixtures thereof sufficient to provide at least some of the acidity normally provided by the fermentation process.

8. The process as recited in claim 7 wherein said comminuted meat product comprises a fermented type sausage including comminuted meat, spice and cure and from about 2% to about 8% of a whey-protein containing material prepared by a culturing process using a blend of *L. bulgaricus* and *S. thermophilus*.

9. An acidic flavored encased comminuted meat product selected from the group consisting of dry sausage, semi-dry sausage, fermented sausage, fresh sausage, brown and serve sausage, cooked sausage, luncheon loaf, meat sticks which comprises said meat product in combination with an amount of a dry cultured dairy product prepared by a culturing process using *L. bulgaricus, S. thermophilus, L. acidophilus, P. cerevisiae, L. plantarum* and mixtures thereof sufficient to provide at least some of the acidic flavor.

10. The meat product as recited in claim 9 wherein said cultured dairy product is used in an amount ranging from about 2% to about 8% by weight of the meat.

11. The meat product as recited in claim 9 wherein said culturing process is conducted to an end point within the pH range of from about 4.1 to about 4.8.

12. In an encased comminuted meat product which is normally fermented to provide an increased level of acidity in the meat selected from the group consisting of dry sausage, semi-dry sausage, luncheon loaf and meat sticks, the improvement which comprises adding to the meat during the preparation of said meat product an effective amount of a dry cultured dairy product prepared by a culturing process using *L. bulgaricus, S. thermophilus, L. acidophilus, P. cerevisiae, L. plantarum* and mixtures thereof sufficient to provide at least some of the acidity normally provided by fermentation.

13. The meat product as recited in claim 12 wherein said culturing process is conducted to an end point within the pH range of from about 4.1 to about 4.8.

14. The meat product as recited in claim 12 wherein said cultured dairy product is prepared by a culturing process using a whey protein base.

15. The meat product as recited in claim 12 wherein said cultured dairy product further includes a member selected from the group consisting of NFDM, whey protein concentrate, sodium or calcium caseinate, acid stable caseinate, whey solids, hydrolyzed cereal solids, vegetable protein, sugars and mixtures thereof.

16. The meat product as recited in claim 12 wherein said comminuted meat product comprises a fermented type sausage including comminuted meat, spice and cure and from about 2% to about 8% of a whey-protein containing material prepared by a culturing process using a blend of *L. bulgaricus* and *S. thermophilus*.

* * * * *